United States Patent [19]
Verbunt et al.

[11] Patent Number: 4,729,161
[45] Date of Patent: Mar. 8, 1988

[54] METHOD OF MANUFACTURING A MAGNETIC HEAD

[75] Inventors: Johannes P. M. Verbunt; Wilibrordus G. M. Van Den Hoek, both of Eindhoven, Netherlands

[73] Assignee: U.S. Philips Corporation, New York, N.Y.

[21] Appl. No.: 912,453

[22] Filed: Nov. 3, 1986

Related U.S. Application Data

[60] Division of Ser. No. 821,505, Jan. 21, 1986, which is a continuation of Ser. No. 462,272, Jan. 31, 1983, abandoned.

[30] Foreign Application Priority Data

Feb. 12, 1982 [NL] Netherlands ................. 8200531

[51] Int. Cl.$^4$ ............................................. G11B 5/42
[52] U.S. Cl. ...................................... 29/603; 29/407; 360/119
[58] Field of Search ................ 296/603, 407; 360/119

[56] References Cited

U.S. PATENT DOCUMENTS

| | | | |
|---|---|---|---|
| 3,531,859 | 10/1970 | Van der Voo | 29/603 |
| 3,751,803 | 8/1973 | Fisher et al. | 29/603 |
| 4,192,985 | 3/1980 | Berghof et al. | 29/603 X |
| 4,390,916 | 6/1983 | Chow et al. | 29/603 X |
| 4,477,968 | 10/1984 | Kracke et al. | 29/603 |

Primary Examiner—Carl E. Hall
Attorney, Agent, or Firm—F. Brice Faller

[57] ABSTRACT

A magnetic head (1) includes a core of a magnetic material having two parts (2, 3) spaced apart from each other to form a non-magnetic transducing gap (4) which is bounded on one side by a winding aperture (5) extending in the gap-bounding surface of at least one of the core parts and narrowing towards the transducing gap. To produce an accurate gap dimension the part of the winding aperture (5) immediately adjoining the transducing gap (4) is formed by a channel (6, 13, 20, 21, 32, 33) of a defined depth. The channel is formed in the gap-bounding surface of the core parts by means of an etching process. During the etching of the channels polishing marks may be simultaneously produced, the polishing marks serving as guides for subsequent grinding/polishing stages in the production of the magnetic head.

9 Claims, 6 Drawing Figures

METHOD OF MANUFACTURING A MAGNETIC HEAD

This is a division of application Ser. No. 821,505, filed Jan. 21, 1986, a continuation of Ser. No. 462,272, filed Jan. 31, 1983, now abandoned.

BACKGROUND OF THE INVENTION

The invention relates to a magnetic head including a core of a magnetic material having two parts which are spaced apart so that a non-magnetic transducing gap is formed which is bounded on one side by a winding aperture which extends in the gap-bounding surface of at least one of the core parts and narrows towards the transducing gap. The invention further relates to a method of manufacturing such a magnetic head.

Such a magnetic head is known from DE Offenlegungsschrift 26 34 156, to which U.S. Pat. No. 4,045,864 corresponds. In the manufacture of this known magnetic head, the (groove-shaped) winding aperture is provided by means of a grinding operation in the core part in question. Initially, the core part together with a number of further core parts of the same shape form a block of magnetic material. In an accurately worked surface thereof, a longitudinal groove is provided by means of a profiled disc. The block with said grooved surface is cemented against a second block, the bonding means used forming a non-magnetic (transducing) gap. The assembly of the two blocks is given a curved tape-contact face in a further stage of the manufacture by means of a grinding and polishing process. During the grinding/polishing operation so much of the core material is removed that a gap remains between the core parts having a desired gap height. The edge of the groove facing the gap is used in measuring the gap height. It will be obvious that the accuracy with which said edge is formed determines the accuracy with which the gap height can be adjusted. In video heads, a gap height of 50 $\mu$m is usual and inaccuracies in the position of the edge (caused by crumbling away of core material as a result of the grinding process) should not be more than 5 $\mu$m.

Grinding a groove in the core material (usually ferrite) with such a great precision is very difficult.

SUMMARY OF THE INVENTION

It is an object of the invention to provide a magnetic head construction which permits a more precise dimensioning than the known magnetic head construction in which the edge of a ground winding aperture determines the gap height.

The invention provides a magnetic head as described in the opening paragraph characterized in that the part of the winding aperture immediately adjoining the transducing gap is formed by a channel of a defined depth, the channel being produced in the gap-bounding surface by means of an etching process and having an edge which defines the transducing gap height.

Since the invention provides an etched channel having a wall which bounds the lower side of the gap, the degree of accuracy with which the substantial part of the winding aperture can be ground no longer plays a part in determining the gap height. Certain etching processes, such as electrolytic etching, laser etching, and in particular (reactive) ion etching, present the possibility of etching very accurately channels having a depth up to approximately 25 $\mu$m in the core material, in particular in ferrite. It is important that the channel provided by means of an etching process should have side walls which extend at least substantially transversely to the plane in which the channel is provided.

The invention further provides a method of manufacturing a magnetic head which comprises two core parts spaced from each other so that a non-magnetic transducing gap is formed which is bounded on one side by a winding aperture which extends in the gap bounding surface of at least one of the core parts and narrows towards the transducing gap, the method comprising the steps of:

etching a channel in the gap bounding surface of said one core part, one edge of the channel defining the transducing gap height;

forming the winding aperture, the winding aperture not extending as far as said one edge of the channel; and bonding the two core parts together to form a magnetic head having a required transducing gap length.

The channel may be etched by means of a reactive ion etching process. A plurality of core parts may be formed in a single body which is then parted to form individual core parts. Polishing marks may be formed on the core parts, in particular simultaneously with the channel during the same etching step. An important advantage is, that in this manner the polishing marks may have an accurately defined position at a predetermined distance from the edge of the channel which defines the gap height. The tape contact face may be ground/polished until the polishing marks are obliterated.

During etching a channel, the parts of the surface which are not to be etched are covered with a mask which can withstand the attack by the etching process. As will be explained hereinafter, this mask can advantageously be constructed so that the etching process not only forms a channel but also forms polishing marks at a distance from the channel corresponding to the desired gap height. During the grinding/polishing process of the tape contact face, said polishing marks provide a visual indication as to how long this process has to be continued. For example, the polishing marks may consist of a channel which is filled with an electrically conductive material so that a conductor is formed. Grinding-through of the conductor may then be used as an indication that the final size has been reached.

DETAILED DESCRIPTION OF THE PREFERRED EMBODIMENT

Figure 1:
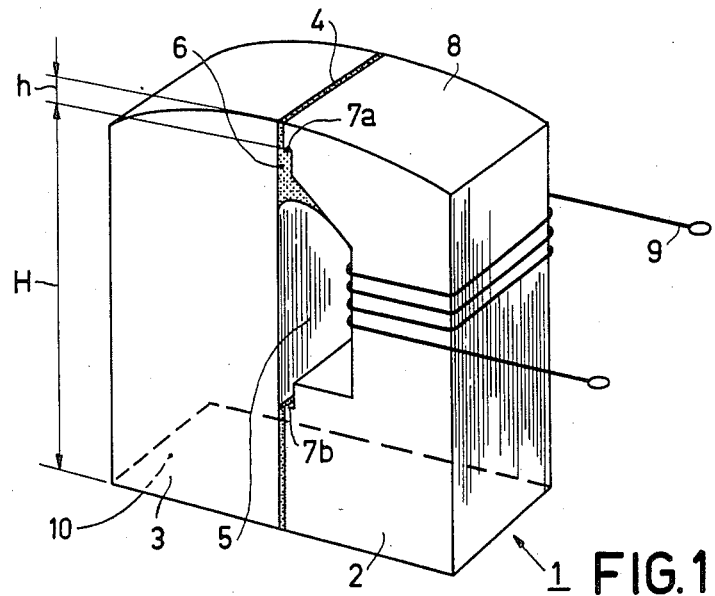
FIG. 1 is a perspective view of a magnetic head produced in accordance with the invention.

FIG. 1 shows a magnetic head in accordance with the invention having two spaced apart core parts 2 and 3 of a magnetic material between which a non-magnetic transducing gap 4 is formed. A winding aperture or core chamber 5 through which a winding 9 is wound is provided in core part 2. On the side facing coil chamber 5, the transducing gap 4 is bounded by a channel 6 having walls 7a and 7b produced by means of an etching process. Transducing gap 4, channel 6 and a part of the coil chamber 5 are filled with an adhesive, for example glass, which bonds the core parts 2 and 3 together. As a result of providing channel 6, the transducing gap 4 has an accurately defined height h which is adjusted during the shape grinding/polishing process of tape contact face 8. The gap height h of a video head is, for example, 50 µm.

Figure 2:
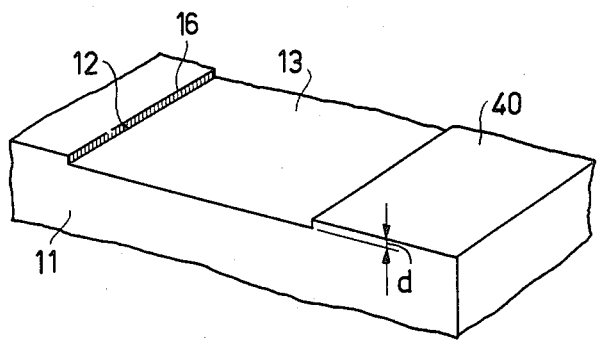
FIG. 2 is a perspective view of a block of core material in which a channel has been etched.

Core part 2 is formed from a block of core material 11 (FIG. 2). A channel 13 having a depth d of approximately 10 to 25 µm is etched in a gap-bounding surface 40. When the core material is (monocrystalline) Mn-Zn ferrite, an effective method of etching a channel 13 with straight walls down to such a depth is ion etching in a chlorine-containing or bromine-containing plasma, so-called reactive ion etching.

Figure 3:
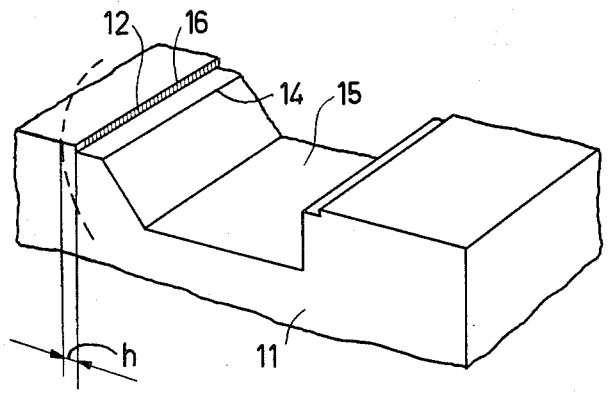
FIG. 3 is a perspective view of the block of FIG. 2 with a winding aperture formed in it.

A useful mask material in that case is $Al_2O_3$ which is etched away 5 to 10 times less rapidly than Mn-Zn ferrite. After providing channel 13, a coil chamber 15 is ground. This is done in such manner that the accurately defined wall 12 of channel 13 is maintained. Edge 16 of wall 12 defines the lower side of the transducing gap in the ultimate magnetic head. The adjustment of the desired height h of the transducing gap is produced by grinding/polishing a tape contact face (for illustration shown in broken lines in FIG. 3) after core block 11 and a second core block have been cemented together to form one core block assembly. Crumbling away of edge 14 of the coil chamber 15 which may result from the grinding process used to form the coil chamber 15 cannot play a part in said adjustment.

The invention also enables the accurate adjustment of the gap height (h). Up to now two different methods have been used for adjusting the gap height:

a. define the position of the coil chamber (5) with respect to a reference face 10 very accurately. The dimension H is then known (FIG. 1). During the grinding and polishing operation place the "reference" 10 against an abutment and carry out the operation with respect to said abutment. Practice has taught that the demanded size accuracy is difficult to achieve.

b. Measure the gap height microscopically during the grinding and polishing processes. This must be done at the end of the assembly of the core blocks, so that the end faces of the assembly must previously be polished. Because such an assembly during polishing to reach the desired radius also obtains a certain rounding off in the length, the reliability of said measurement is not sufficient and often not reproducible.

The invention also relates to providing by means of an etching process, in particular reactive ion etching, a polishing mark at a given position (50 µm) with respect to the edge 16 of the coil chamber 15 (FIG. 3), so as to be able to accurately adjust the gap height.

This polishing mark may be a triangle the base of which is equal to the height (a shape which is used successfully in polishing thin-film heads).

The providing by means of an etching process of both coil chamber and polishing mark can be realised in one operation. A plan view of a "double" core block (11) in one embodiment is shown in FIG. 4.

Figure 4:
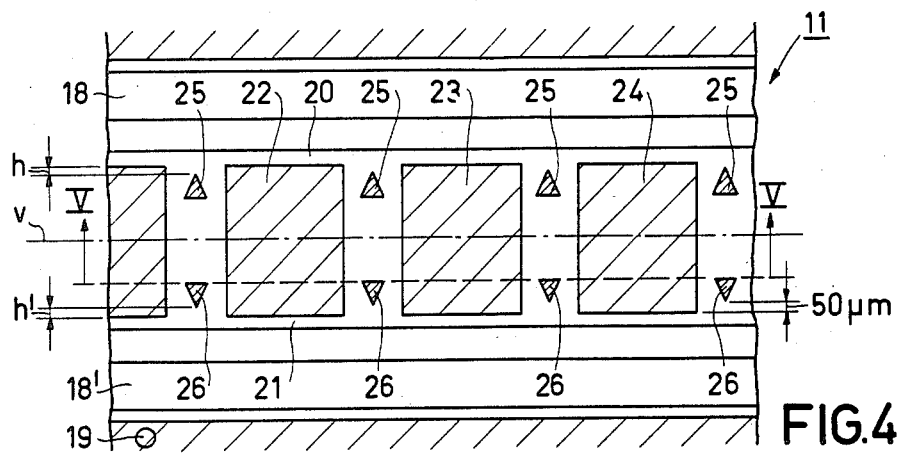
FIG. 4 is a plan view of a block of core material in which a pattern of channels and polishing marks has been etched.

FIG. 4 shows a core block 11 having two winding apertures (18, 18') situated symmetrically with respect to a future sawing plane V and a structure etched in the gap-bounding surface (19) of core block 16 which structure comprises two channels (20, 21) leaving "islands" (22, 23, 24) and triangular polishing marks (25, 26). Each island has opposed parallel walls which parallel respective winding apertures 18, 18'; these etched walls will ultimately bound the respective transducing gaps. The polishing marks (25, 26) are spaced from respective lines colinear with one wall of each island by a distance equal to the respective gap heights h, h'.

Figure 5:
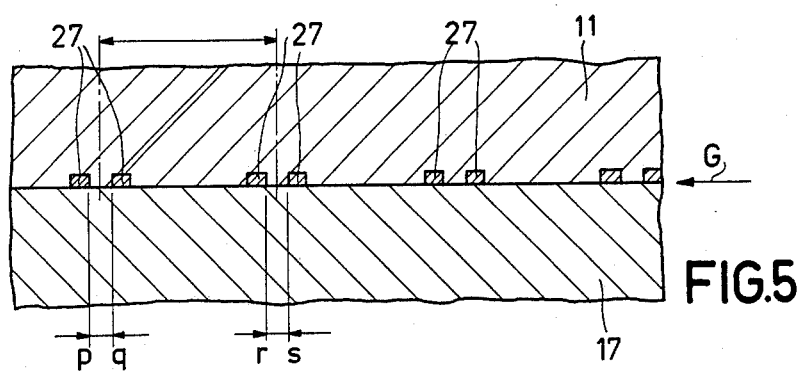
FIG. 5 is a cross-sectional view taken on the line V—V through the block of core material of FIG. 4 after a second block has been cemented to it.

After the core block (11) thus structured has been cemented to a counter block (17) and this combination has been sawn, two core block assemblies are obtained which are each to be radiused. In this grinding and polishing operation a structure as shown in FIG. 5 is obtained in the gap area G. Gap area G is filled with glass which bonds the blocks (11, 17) together. Glass-filled channels (27) are also visible which pairwise bound the polishing marks (25) and (26), respectively. The legnth of the areas p-q, r-s indicates the gap height which has been reached at a given instant in the polishing process. As soon as said length has been reduced to 0 µm, eradicating the polishing mark, the required gap height (50 µm) has been reached. Experience gained in the manufacture of thin-film heads teaches that this is possible to an accuracy of a few µm.

The distance between p-q and r-s (pitch) is the sum of the desired core thickness and the losses of the sawing process with which the assembly of the blocks 11, 17 is ultimately divided into individual head cores. Of course, variations are possible with reference to the above-mentioned dimensions as well as with reference to other size indications by structuring.

Figure 6:
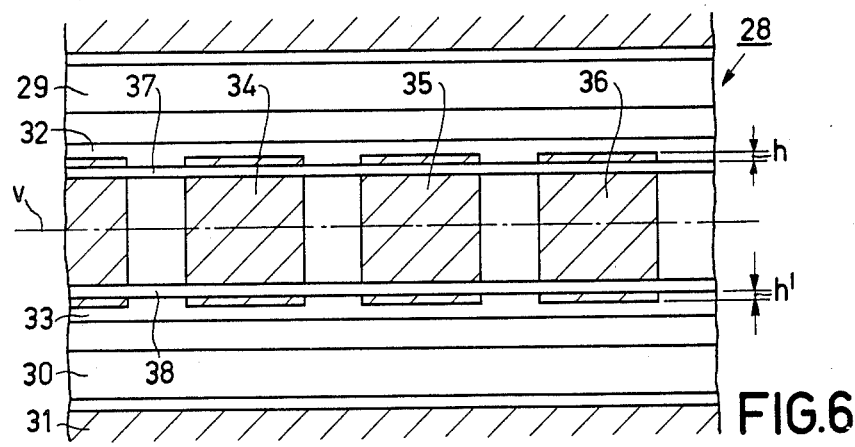
FIG. 6 is a plan view of a block of core material in which an alternative pattern of channels and polishing marks has been provided.

FIG. 6 is a plan view of a core block 28. This also comprises two winding apertures (29, 30) and a structure has been etched in the gap-bounding surface (31) which comprises two channels (32, 33) leaving "islands" (34, 35, 36). Each island has opposed parallel walls which parallel respective winding apertures 29, 30; these etched walls will ultimately bound the respective transducing gaps. As polishing marks the etched structure also comprises channels (37, 38) spaced from respective lines colinear with one wall of each island by a distance equal to the respective gap heights h, h'. The channels (37, 38) for example, have a width of 5 µm and a depth of 5 µm. They are filled with an electrically conductive material (for example, via sputtering, vapour-deposition or electro-deposition). In the grinding-/polishing process of the tape contact face of the core block assembly which is formed after core block 28 has been cemented to a counter core block (not shown) the moment of grinding through such channels (37) and (38) filled with conductive material, serves as an indication that the final size of the gap height has been reached.

What is claimed is:

1. A method of manufacturing a magnetic head of the type comprising two core parts which form a tape contact face, each core part having a gap bounding surface, said gap bounding surfaces being spaced to form a transducing gap therebetween, said method comprising the following steps:

etching a channel in the gap bounding surface of one of said core parts, said channel having a floor bounded on one side by a wall, etching a polishing mark in said one of said core parts, said polishing mark being spaced a predetermined distance from a line colinear with said one wall of said channel, forming a winding aperture in said channel, said winding aperture having an edge spaced from said one wall, bonding said core parts together to form a magnetic head having a transducing gap of desired length, and grinding the tape contact face opposite said gap from said channel using said polishing mark to control the distance between said tape contact face and said one wall defining the gap height.

2. A method as in claim 1, wherein said one of said core parts is manufactured from a core block, said polishing mark being etched in said core block.

3. A method as in claim 2 wherein said polishing mark is defined by etching thereabout, said polishing mark remaining as a stand-off above the level of the floor of said channel.

4. A method as in claim 2 wherein said polishing mark is shaped substantially as a triangle with an apex toward said channel, whereby said polishing mark will disappear upon sufficient grinding of a tape contact face, said one wall and said tape contact face bounding said gap.

5. A method as in claim 2 wherein the polishing mark is spaced from said line by a distance corresponding to the desired height of the transducing gap.

6. A method as in claim 2 wherein the polishing mark and the channel are formed by reactive ion etching.

7. A method as in claim 2 wherein a plurality of said one of said core parts are formed in a single body having islands standing off from said gap bounding surface, said islands each having an edge defining said one wall, said edges being colinear, each polishing mark lying between two adjacent walls.

8. A method as in claim 2 wherein said polishing mark comprises a polishing channel spaced from said one wall, the distance therebetween defining the desired gap height.

9. A method as in claim 8 wherein said channel is filled with conductive material, said conductive material being ground away to reach the desired gap height.

* * * * *